(12) United States Patent
Nam et al.

(10) Patent No.: US 7,932,699 B2
(45) Date of Patent: Apr. 26, 2011

(54) METHOD OF CONTROLLING BATTERY CHARGE LEVEL OF HYBRID ELECTRIC VEHICLE

(75) Inventors: Yeong Jin Nam, Ansun-si (KR); Jae Sung Gu, Hwaseong-si (KR); Chae Mo Yang, Gunpo-si (KR); Suk Hyung Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 898 days.

(21) Appl. No.: 11/850,448

(22) Filed: Sep. 5, 2007

(65) Prior Publication Data

US 2008/0136375 A1 Jun. 12, 2008

(30) Foreign Application Priority Data

Dec. 11, 2006 (KR) .................. 10-2006-0125253

(51) Int. Cl.
    *H02J 7/00* (2006.01)
(52) U.S. Cl. .................. 320/134; 320/136; 320/162
(58) Field of Classification Search .................. 320/134
    See application file for complete search history.

(56) References Cited

U.S. PATENT DOCUMENTS

| | | | |
|---|---|---|---|
| 5,646,507 A | 7/1997 | Timmons et al. | |
| 5,761,072 A | 6/1998 | Bardsley, Jr. et al. | |
| 7,836,985 B2 * | 11/2010 | Itoh | 180/65.21 |
| 2005/0189894 A1 * | 9/2005 | Komiyama et al. | 318/376 |

FOREIGN PATENT DOCUMENTS

| | | |
|---|---|---|
| JP | 2000-295775 | 10/2000 |
| JP | 2002-243813 | 8/2002 |
| JP | 2002-325362 | 11/2002 |
| JP | 2006-022710 | 1/2006 |
| KR | 100191917 | 1/1999 |

* cited by examiner

*Primary Examiner* — Edward Tso
*Assistant Examiner* — Johali A Torres Ruiz
(74) *Attorney, Agent, or Firm* — Morgan, Lewis & Bockius LLP

(57) ABSTRACT

A method of controlling a battery charge level of a hybrid electric vehicle includes: monitoring a quantity of current accumulated for a predetermined time based on a battery charge/discharge current value; calculating a regenerative charge derating constant; calculating a correction coefficient based on the quantity of current accumulated and a battery state of charge; multiplying the regenerative charge derating constant by the correction coefficient to calculate a final regenerative charge derating constant; and multiplying the final regenerative charge derating constant by a charge power to calculate a final charge power, and selectively restricting the battery charge level based on the final charge power.

2 Claims, 5 Drawing Sheets

| accumulated current quantity / SOC | 0 | 0.1 | 0.2 | 0.3 | 0.4 | 0.5 |
|---|---|---|---|---|---|---|
| 0.62 | 1 | 0.8 | 0.6 | 0.4 | 0.3 | 0.2 |
| 0.66 | 1 | 0.6 | 0.4 | 0.3 | 0.2 | 0 |
| 0.7 | 1 | 0.4 | 0.3 | 0.1 | 0 | 0 |
| 0.74 | 1 | 0.3 | 0.1 | 0 | 0 | 0 |
| 0.78 | 1 | 0.1 | 0 | 0 | 0 | 0 |

METHOD OF CONTROLLING BATTERY CHARGE LEVEL OF HYBRID ELECTRIC VEHICLE

CROSS-REFERENCE TO RELATED APPLICATIONS

This application claims the benefit under 35 U.S.C. §119(a) of Korean Patent Application No. 10-2006-0125253, filed in the Korean Intellectual Property Office on Dec. 11, 2006, the entire contents of which are incorporated herein by reference.

BACKGROUND OF THE INVENTION (a) Field of the Invention

The present invention relates to a method of controlling a battery charge level of a hybrid electric vehicle. More particularly, the present invention relates to such a method which can selectively restrict the battery charge level to prevent excessive increase in battery temperature.

(b) Background Art

The term "hybrid vehicle," in its broadest sense, refers to a vehicle that utilizes at least two different kinds of power sources. Usually, the term refers to a vehicle that uses fuel and an electric motor, driven by a battery. Such a vehicle is more precisely called a hybrid electric vehicle (HEV).

The hybrid electric vehicle can take on many various structures. Most hybrid electric vehicles are either parallel type or series type.

The parallel type hybrid electric vehicle is configured such that the engine charges the battery and also directly drives the vehicle together with the electric motor. Such a parallel type hybrid electric vehicle has a shortcoming in that its structure and control logic are relatively complicated compared to the series type. Nevertheless, since this parallel type hybrid electric vehicle is efficient in that it utilizes the mechanical energy of the engine and the electric energy of the battery simultaneously, it is widely adopted in passenger cars, etc.

SUMMARY OF THE INVENTION

A method of controlling a battery charge level of a hybrid electric vehicle includes: monitoring a quantity of current accumulated for a predetermined time based on a battery charge/discharge current value; calculating a regenerative charge derating constant; calculating a correction coefficient based on the quantity of current accumulated and a battery state of charge; multiplying the regenerative charge derating constant by the correction coefficient to calculate a final regenerative charge derating constant; and multiplying the final regenerative charge derating constant by a charge power to calculate a final charge power, and selectively restricting the battery charge level based on the final charge power.

Calculating the correction coefficient may include setting the correction coefficient to a value smaller than 1 in an accumulated current quantity region corresponding to a rapid charge condition, and setting the correction coefficient to 1 in an accumulated current quantity region that does not correspond to the rapid charge condition.

An alternative method includes: monitoring a battery charge/discharge current value; determining whether or not a continuous charge mode entry condition is satisfied based on a charge current and an accumulated current quantity calculated by accumulating the monitored battery charge/discharge current value at certain time intervals; entering a continuous charge mode if it is determined that the continuous charge mode entry condition is satisfied, and calculating a regenerative charge derating constant, set as a value smaller than "1" according to a position of a transmission gear and a battery state of charge coefficient; multiplying the derating constant by a charge power to calculate a final charge power, and restricting the battery charge level based on the final charge power.

Determining whether or not a continuous charge mode entry condition is satisfied may include determining that the continuous charge mode entry condition is satisfied if a first condition and a second condition are both satisfied, the first condition being a condition in which the current quantity accumulated for a given time is smaller than a predetermined value, and the second condition being a condition in which when a negative charge current for a given time is below a predetermined negative value, a count is incremented, and a count value exceeds a predetermined count value every certain period.

The continuous charge mode entry may be banned if a current battery temperature is below a predetermined temperature.

The continuous charge mode may be maintained until a continuous charge mode release condition occurs after the continuous charge mode.

When a negative charge current for a given time is below a predetermined negative value, a count may be incremented, and it is determined whether or not a count value is smaller than a predetermined count value every certain period. If the count value is smaller than the predetermined count value continuously more than a predetermined frequency of condition occurrences, the continuous charge mode may be released.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION

A typical hybrid electric vehicle is equipped with a hybrid control unit (HCU) for controlling the overall operation of the vehicle. For example, the HCU includes an engine control unit (ECU), a motor control unit (MCU), a transmission control unit (TCU), a battery management system (BMS), a full auto temperature controller (FATC) for controlling the interior temperature of the vehicle and the like.

These control units are interconnected via a high-speed CAN communication line with the hybrid control unit as an upper controller so that they mutually transmit and receive information.

In addition, the hybrid electric vehicle includes a high voltage battery, or main battery, for supplying the driving power of the electric motor. The high voltage battery supplies a needed power while continuously charging and discharging during driving.

The high voltage battery supplies (discharges) electric energy during the motor assist operation and stores (charges) electric energy during regenerative braking or engine driving. The battery management system (BMS) transmits the battery state of charge (SOC), available charge power, available discharge power, etc., to the HCU/MCU to perform safety and lifespan management of the battery.

Typically, a regenerative charge derating constant according to battery SOC and vehicle speed is calculated on the basis of a charge mode and a discharge mode, respectively, and then is finally multiplied by a charge power so as to restrict the battery charge level.

Figure 1:
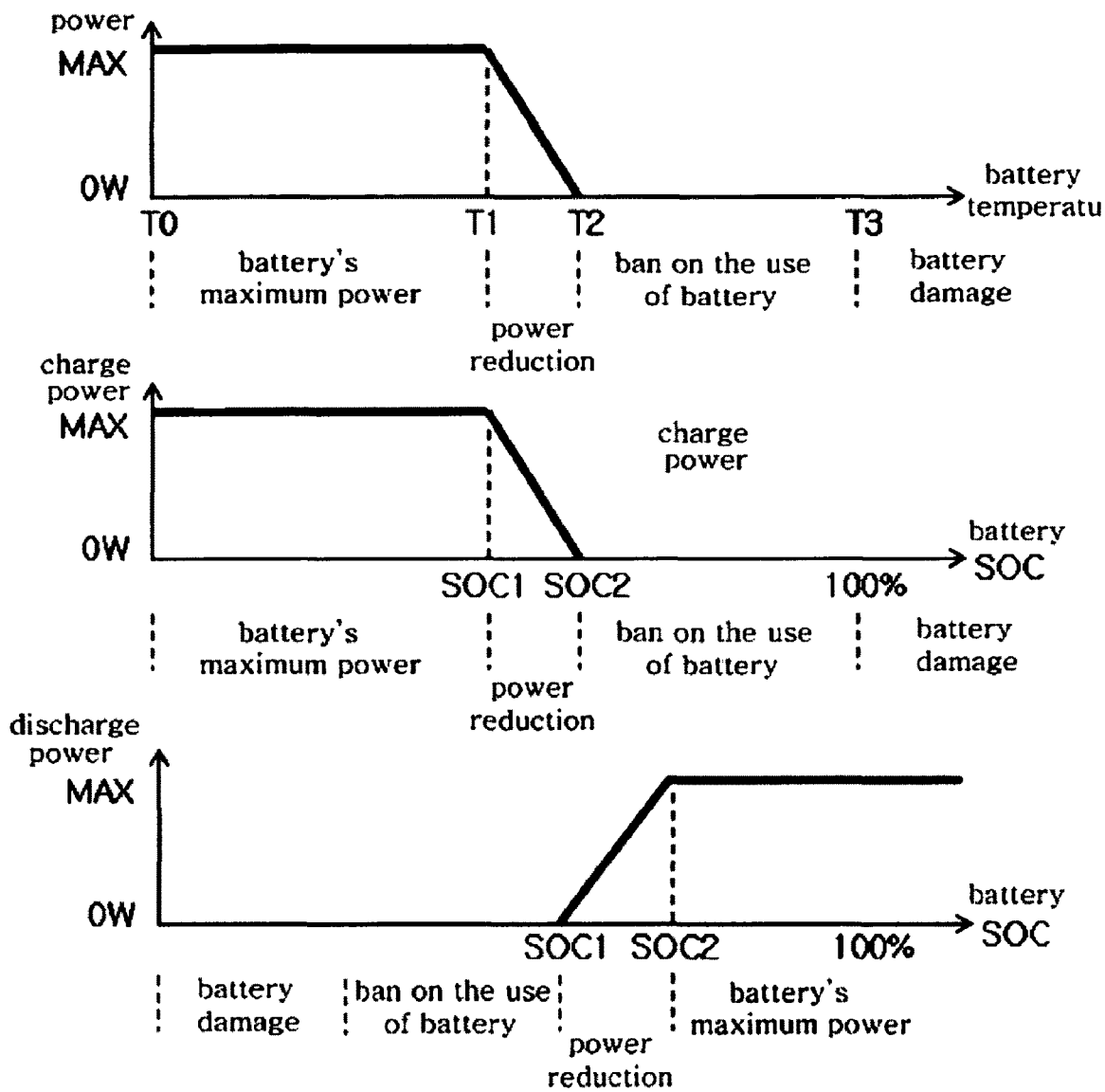
FIG. 1 is a graph illustrating the charge/discharge control of a battery according to the prior art.

Also, the BMS calculates a chargeable/dischargeable power in real time in consideration of battery temperature, battery SOC, etc. Several examples of power reduction control depending on each variable are as follows (see FIG. 1):

1. Power reduction control depending on the battery temperature: If the battery temperature rises, the BMS carries out a control of reducing the chargeable/dischargeable power of the battery.

2A. Power reduction control depending on the battery SOC: If the battery SOC increases, the BMS carries out a control of reducing the chargeable power of the battery.

2B. Power reduction control depending on the battery SOC: If the battery SOC decreases, the BMS carries out a control of reducing the dischargeable power of the battery.

However, the control of a battery charge level of a hybrid electric vehicle according to the prior art encounters the following problems.

First, conventionally, only the battery SOC and the vehicle speed are taken into consideration as factors for finding the derating constant, so that the battery temperature rises by a battery chemical reaction due to a large quantity of electric charge, measured in Ampere-hours (Ah), during battery charging.

Conventionally, such a temperature rise is not properly corrected for, and if a battery cooling fan does not work, such as when the vehicle is parked after downhill driving (being charged in a large quantity of electric charge), the battery temperature reaches a dangerous level, so that a hybrid functions (motor assist, motor start, etc.) are not performed normally.

Especially when the vehicle is parked after the battery is continuously charged at high power during mountainous downhills, the battery temperature rises excessively due to the latent heat of the battery during parking.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2:
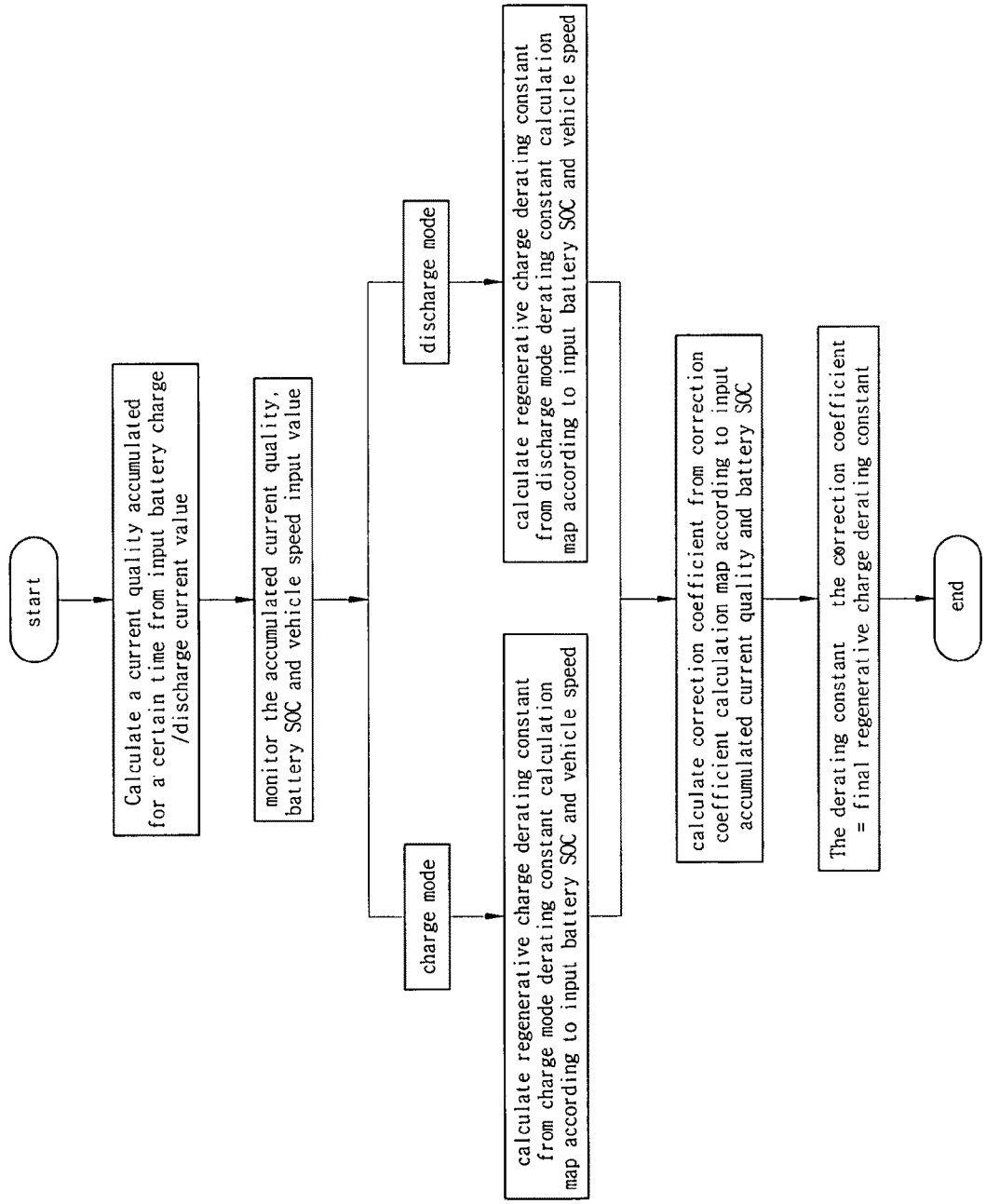
FIG. 2 is a flowchart illustrating the process of finding a regenerative charge derating constant in a method of controlling a battery charge level of a hybrid electric vehicle according to a first embodiment of the present invention.
Figure 3:
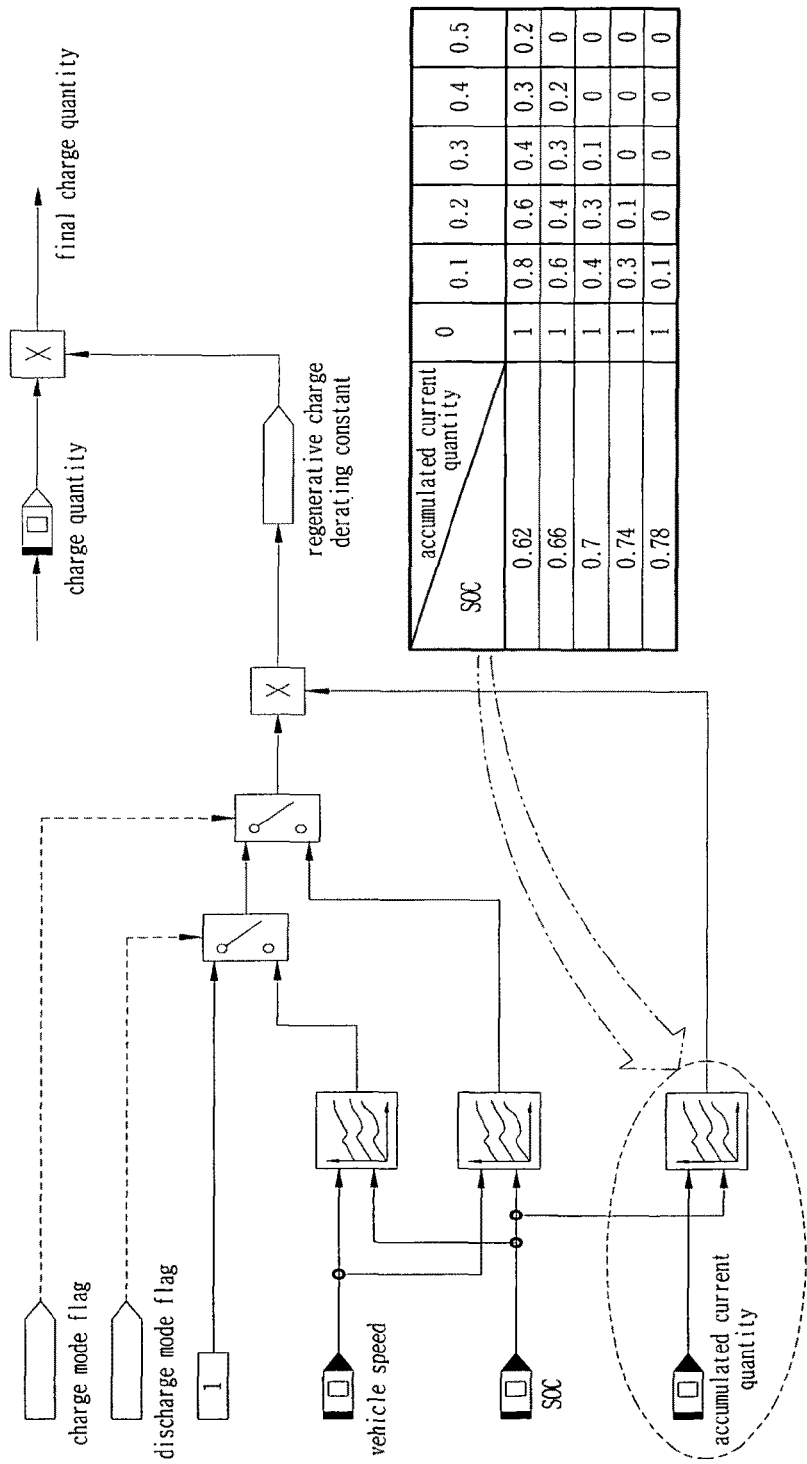
FIG. 3 is a schematic diagram illustrating a logic configuration by which the restriction of the battery charge level is performed according to the present invention.

In the first embodiment shown in FIGS. 2 and 3, a restriction of the charge power of a high-voltage battery (main battery) is controlled depending on the accumulated current quantity to prevent an excessive rise in the battery temperature due to the rapid charge of the battery.

That is, the current quantity (i.e., an integral value of the quantity of electric charge over time, measure in Ampere-hours [Ah]) accumulated for a predetermined time is monitored. When rapid charge progresses during which the integral value is below a predetermined level, a correction coefficient according to the accumulated current quantity is applied to a final regenerative charge derating constant calculation end to restrict a charge power. In this manner, the charge power is restricted depending on the accumulated current quantity according to a vehicle traveling condition to thereby prevent an excessive rise in the battery temperature due to the rapid charge of the battery and the interruption of a hybrid function due to the excessive rise in the battery temperature.

Herein, the term "current quantity" refers to an instantaneous current value detected from a current sensor at the time of the battery charge/discharge, and the accumulated current quantity is positive (+) at the time of the uphill traveling of the vehicle and negative (−) at the time of the downhill traveling of the vehicle.

In the first embodiment, a regenerative charge derating constant according to the battery SOC and the vehicle speed is calculated in a charge mode. This may be done in any known manner. Then a correction coefficient according to the accumulated current quantity is additionally applied to the calculated derating constant to find a final regenerative charge derating constant, which is used to calculate a charge power.

A charge power, calculated by a separate logic, is multiplied by a final regenerative charge derating constant (a value smaller than 1) to thereby restrict the battery charge level. In the first embodiment of the present invention, a charge power calculated by a separate logic is multiplied by a final regenerative charge derating constant obtained by additionally applying the accumulated current quantity to thereby calculate a final charge power, and the battery charge level is restricted, i.e. the calculated final charge power is applied to the battery charge.

A process of controlling a battery charge level of a hybrid electric vehicle according to the first embodiment of the present invention will be described hereinafter in more detail.

First, a current quantity accumulated for a predetermined time (for example, for 1 second) is calculated and monitored from a battery charge/discharge current value that is input from a current sensor. At this time, the battery SOC and the vehicle speed are monitored.

Further, a regenerative charge derating constant is found from a charge mode derating constant calculation map according to a battery SOC and a vehicle speed in a charge mode (charge mode flag value of "1" is input) and is found from a separate discharge mode derating constant calculation map according to a battery SOC and a vehicle speed in a discharge mode during driving.

Also, in the present invention, the regenerative charge derating constant found in the above step is multiplied by a correction coefficient (a value less than 1) calculated from a correction coefficient calculation map according to the monitored accumulated current and the battery SOC to calculate a final regenerative charge derating constant.

The correction coefficient calculation map corrects the derating constant in a rapid charge condition. The correction coefficient is less than 1 in an accumulated current quantity region corresponding to the rapid charge condition, and is equal to 1 in an accumulated current quantity region that does not correspond to the rapid charge condition in the correction coefficient calculation map.

Thus, the regenerative charge derating constant found in the above step is multiplied by a correction coefficient smaller than "1" in the accumulated current quantity region corresponding to the rapid charge condition, so that a regenerative charge derating constant smaller than the regenerative charge derating constant found from the derating constant calculation map is determined as a final regenerative charge derating constant. On the other hand, the regenerative charge derating constant found from the derating constant calculation map is determined as a final regenerative charge derating constant as it is in the accumulated current quantity region that does not correspond to the rapid charge condition.

As such, when the accumulated current quantity falls within the rapid charge condition, the final regenerative charge derating constant corrected by the correction coefficient is multiplied by a charge power calculated by separate logic to thereby calculate a final charge power.

Resultantly, when the final charge power is calculated, the battery charge level of the vehicle is restricted based on the calculated final charge power. The restriction of the battery charge level of the vehicle prevents excessive rise in the battery temperature due to the rapid charge of the battery.

Now, a process of controlling a battery charge level of a hybrid electric vehicle according to a second embodiment of the present invention will be described hereinafter in more detail.

In the second embodiment of the present invention, a battery charge/discharge current value input from a current sensor is monitored. Then, whether or not the vehicle is on a continuous downhill is determined based on the battery charge/discharge current value. If it is determined that a continuous downhill condition is satisfied, the battery charge level is restricted.

In more detail, first, a charge/discharge current (Ah) detected by the current sensor is monitored and a position of a transmission gear and a battery OSC is monitored during the traveling of the vehicle.

Also, if a continuous charge mode entry condition is satisfied, it is determined that the vehicle is on a continuous downhill section. The continuous charge mode entry condition may be as follows:

Continuous Charge Mode Entry Condition

1. First condition for continuous charge mode entry:

First, the monitored battery charge/discharge current (Ah) value is accumulated every certain time interval and an accumulated current quantity is calculated. If the current quantity accumulated for a given time is smaller than a predetermined value, the program determines that the battery is in the continuous charge mode.

Figure 4:
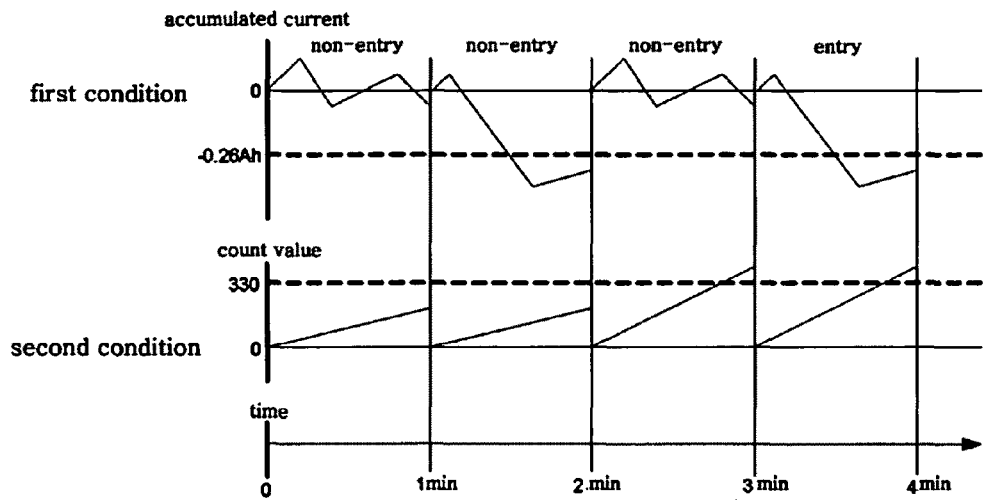
FIG. 4 is a timing chart graph illustrating an example of the case where the operation mode is switched to a continuous charge mode in a method of controlling a battery charge level of a hybrid electric vehicle according to a second embodiment of the present invention.

That is, during typical battery charge/discharge, an instantaneous current value detected from the current sensor represents a negative (−) value in case of charge and represents a positive (+) value in case of discharge. This current value is accumulated every certain time interval (for example, one minute) and the accumulated current quantity is calculated. As shown in FIG. 4, the first condition for the continuous charge mode entry is satisfied if the current quantity accumulated for a given time (for example, two minutes) is smaller than a predetermined value (for example, −0.26 A)(the accumulated current quantity <−0.26 A).

2. Second condition for the continuous charge mode entry:

If when a charge current for a given time is below a predetermined value, a count is incremented, and a count value exceeds a predetermined count value every certain period, the program determines that the battery is in the continuous charge mode. In case of the charge by an engine driving force but not a regenerative charge, the count is not incremented. On the other hand, if a regenerative charge current during the regenerative charge is more than a predetermined value, the count is incremented.

That is, the second condition for the continuous charge mode entry is satisfied if when the regenerative charge current for a given time (for example, 100 ms) is smaller than a predetermined value (for example, −7 A) (regenerative charge current=−7 A), a count is incremented and, as shown in FIG. 4, a count value exceeds a predetermined count value (for example, 330) (count value >330) every certain period (for example, one minute).

As shown in FIG. 4, only if the aforementioned two conditions for the continuous charge mode entry are satisfied, the program enters the continuous charge mode, and it is determined that the vehicle is on a continuous downhill.

In this case, as a continuous charge mode entry ban condition, if a current battery temperature is below a predetermined temperature (for example, 35° C.), the continuous charge mode entry is banned.

In addition, after the program enters the continuous charge mode, the continuous charge mode is maintained until there occurs a continuous charge mode release condition which will be described later.

Figure 6:
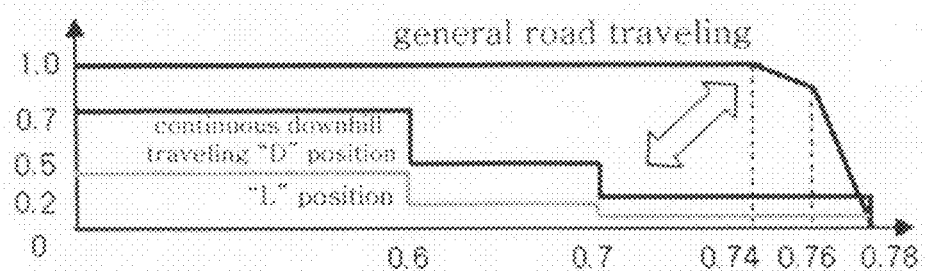
FIG. 6 is a graph a illustrating an example of a regenerative charge derating constant calculation map in a method of controlling a battery charge level of a hybrid electric vehicle according to a second embodiment of the present invention.
Figure 7:
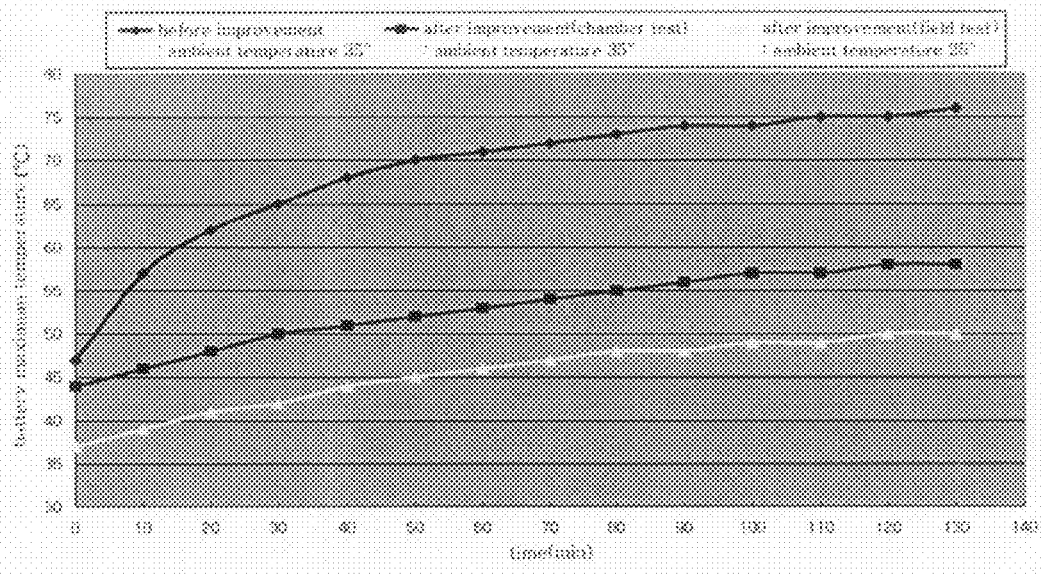
FIG. 7 is a graph illustrating the effect of the restriction of the battery charge level in a method of controlling a battery charge level of a hybrid electric vehicle according to a second embodiment of the present invention.

The continuous charge mode entry condition is satisfied, as shown in FIG. 6, a regenerative charge derating constant is calculated from a regenerative charge derating constant calculation map.

Referring to FIG. 6, during general driving, a regenerative charge derating constant is set as "1" so that a battery charge level of the vehicle is not restricted. But if it is determined that the continuous charge mode entry condition is satisfied, the program enters a continuous charge mode and calculates a regenerative charge derating constant set as a value smaller than "1" according to a current position ("D", "L") of a transmission gear and a battery OSC coefficient (value according to the current battery SOC).

Also, a charge power, calculated by separate logic, is multiplied by the final regenerative charge derating constant to thereby calculate a final charge power, and then the calculated final charge power restricts the battery charge level. Thus, in such a continuous charge mode, restriction of the battery charge level can prevent an excessive increase in battery temperature.

Continuous Charge Mode Release Condition

In a continuous charge mode release condition, when a charge current for a given time is below a predetermined value, a count is incremented, and it is determined whether or not a count value is smaller than a predetermined count value every certain period. If a condition in which the count value is smaller than the predetermined count value continuously occurs more than a predetermined frequency of condition occurrences, the continuous charge mode is released.

Figure 5:
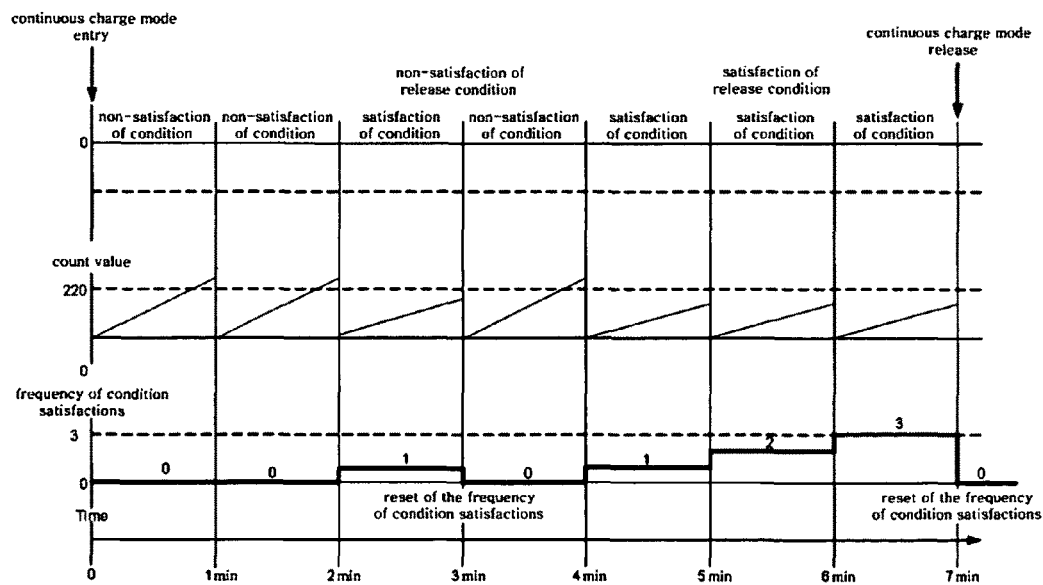
FIG. 5 is a timing chart graphs illustrating an example of the case where the continuous charge mode is released in a method of controlling a battery charge level of a hybrid electric vehicle according to a second embodiment of the present invention.

That is, if when the regenerative charge current for a given time (for example, 100 ms) is smaller than a predetermined value (for example, −7 A) (regenerative charge current=−7 A), a count is incremented and, as shown in FIG. 5, it is determined whether or not a count value is smaller than a predetermined count value (for example, 220) (count value <220) every certain period (for example, one minute). If a condition (count value <220) in which the count value is smaller than the predetermined count value continuously occurs more than a predetermined frequency (for example, three times) of condition occurrences, the continuous charge mode is released.

As such, when the continuous charge mode release condition is satisfied, the battery charge level of the vehicle is not limited, as in general driving.

In case where a vehicle travels along a continuous downhill traveling section so that a continuous charge is performed with high power, the charge is restricted to thereby prevent excessive increase in battery temperature during parking of the vehicle.

The result identified through a test of the effect of the restriction of the battery charge level is shown in Table 1 below. In Table 1, the case where a battery charge level restriction logic is not applied and the case where a battery charge level restriction logic is applied are compared with each other.

As can be seen from Table 1 below, when restriction logic is applied, excessive increase in battery temperature is prevented after a key-off operation. All tests in Table 1 were conducted under an ambient temperature of 35° C.

TABLE 1

|  |  | Temperature just before key-off (° C.) | Temperature after key-off(° C.) | | | |
| --- | --- | --- | --- | --- | --- | --- |
|  |  |  | 10 min | 30 min | 60 min | 130 min |
| Restriction logic not applied |  | 47 | 57 | 65 | 71 | 76 |
| Restriction logic applied | Chamber test result | 44 | 46 | 50 | 53 | 58 |
|  | Field test result | 39 | 39 | 42 | 42 | 50 |

As described above, the method of controlling a battery charge level of a hybrid electric vehicle according to embodiments of the present invention has the following advantageous effects.

First, a battery charge/discharge current value based on a battery charge/discharge current value is monitored, and when the rapid charge progresses during which the integral value is below a predetermined level, a correction coefficient according to the accumulated current quantity is applied to a final regenerative charge derating constant calculation end to restrict a charge power, to thereby prevent an excessive rise in the battery temperature due to the rapid charge of the battery and the interruption of a hybrid function due to the excessive rise in the battery temperature.

Second, a battery charge/discharge current value is monitored, and whether or not a vehicle is on a continuous downhill section is determined based on the monitored battery charge/discharge current value. If it is determined that a continuous downhill condition is satisfied, the battery charge level is restricted to prevent excessive rise in the battery temperature.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling a battery charge level of a hybrid electric vehicle, the method comprising:
    monitoring a quantity of current accumulated for a predetermined time based on a battery charge/discharge current value;
    calculating a regenerative charge derating constant;
    calculating a correction coefficient based on the quantity of current accumulated and a battery state of charge;
    multiplying the regenerative charge derating constant by the correction coefficient to calculate a final regenerative charge derating constant; and
    multiplying the final regenerative charge derating constant by a charge power to calculate a final charge power, and selectively restricting the battery charge level based on the final charge power.

2. The method of claim 1, wherein the calculating the correction coefficient comprises setting the correction coefficient to a value smaller than 1 in an accumulated current quantity region corresponding to a rapid charge condition, and setting the correction coefficient to 1 in an accumulated current quantity region that does not correspond to the rapid charge condition.

* * * * *